Figure 1:
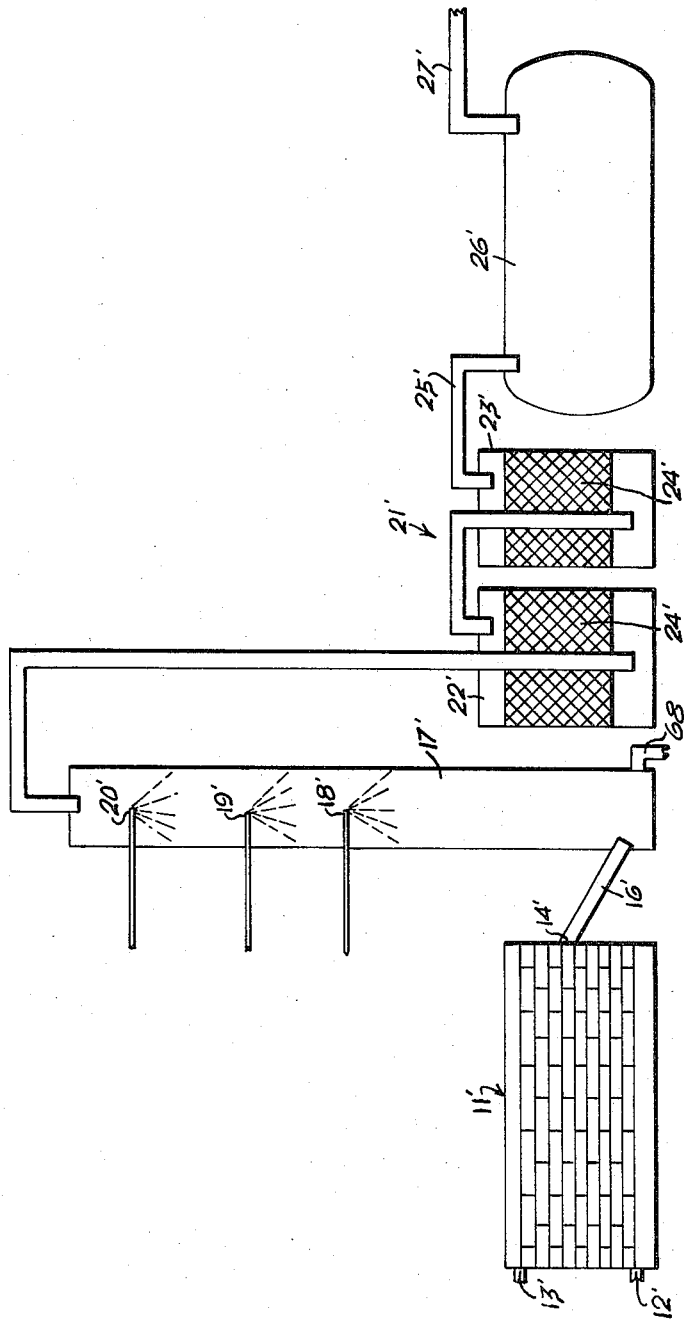

Dec. 13, 1966 H. D. TYSON 3,291,582
PROCESS FOR CONDITIONING GASES PRODUCED
IN REFORMING LIQUID PETROLEUM
Filed Dec. 26, 1963 3 Sheets-Sheet 1

INVENTOR.
HARRY D. TYSON
BY John Cyril Malloy

ATTORNEY.

Dec. 13, 1966  H. D. TYSON  3,291,582
PROCESS FOR CONDITIONING GASES PRODUCED
IN REFORMING LIQUID PETROLEUM
Filed Dec. 26, 1963  3 Sheets-Sheet 2

INVENTOR.
HARRY D. TYSON
BY
John Cyril Malloy
ATTORNEY

Dec. 13, 1966    H. D. TYSON    3,291,582
PROCESS FOR CONDITIONING GASES PRODUCED
IN REFORMING LIQUID PETROLEUM
Filed Dec. 26, 1963    3 Sheets-Sheet 3
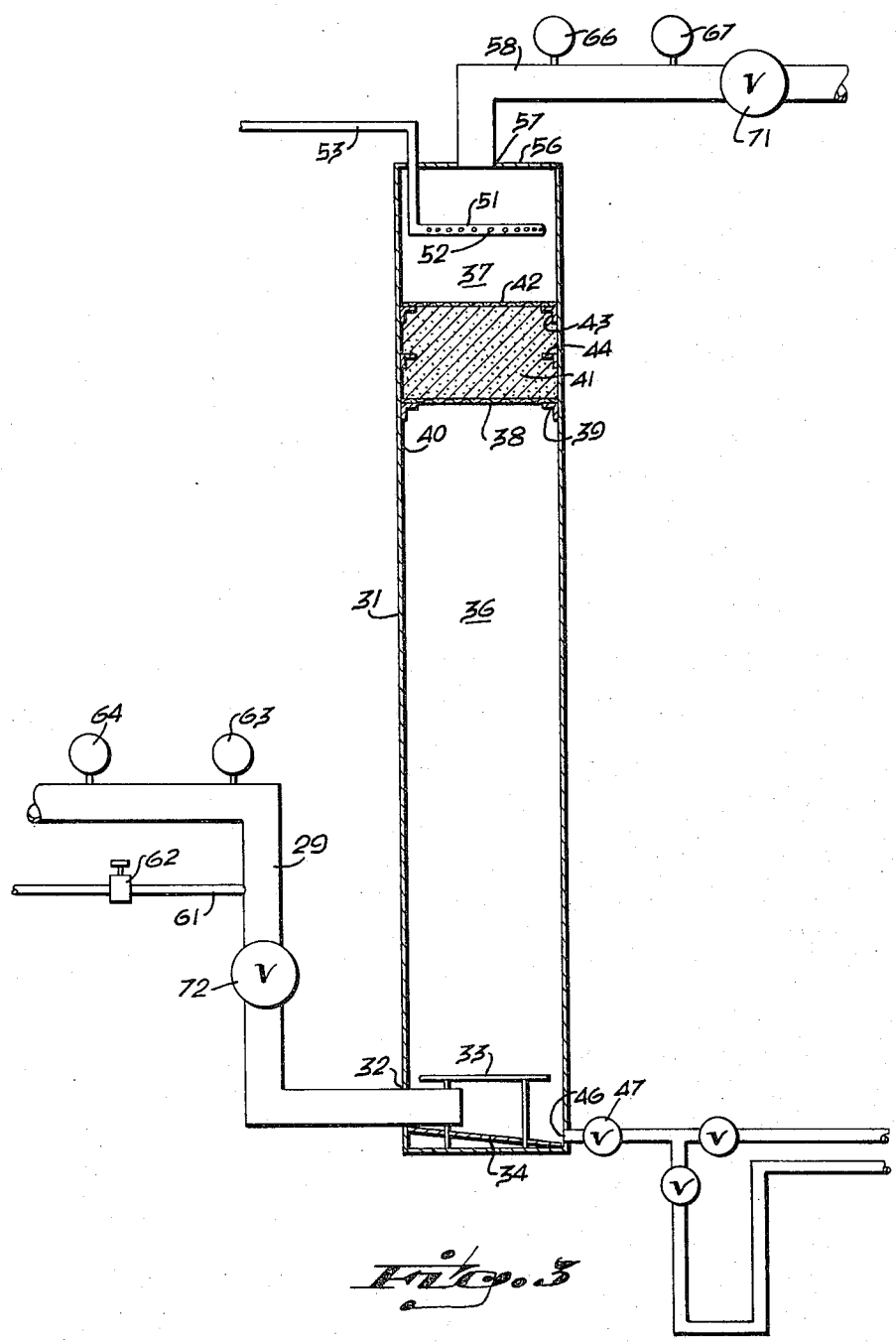
INVENTOR.
HARRY D. TYSON
BY John April Malloy
ATTORNEY.

з,291,582
PROCESS FOR CONDITIONING GASES PRODUCED
IN REFORMING LIQUID PETROLEUM
Harry D. Tyson, 191 NW. 98th St., Miami Shores, Fla.
Filed Dec. 26, 1963, Ser. No. 333,378
3 Claims. (Cl. 48—212)

This invention relates to the removal of gums and acids from gases produced in liquid petroleum reforming operations, which convert the liquid to a gaseous state for storage and transmission to various remote points for use in conventional domestic systems.

As is perhaps well known, the use of reformed liquid petroleum gases, such as propane, butane, and isobutane, to handle peak loads and base loads in gas lines is quite common. In commercial reformers, such as the currently used Hasche type, severe temperature conditions are utilized to crack the liquid petroleum gas hydrocarbons to the lighter hydrocarbons that will more nearly match the burning or heating properties of the gases used in domestic systems. Most of the operations for reforming liquid petroleum gas use an air to liquid petroleum ratio of 1:1 to 2.5:1 and an operating temperature of 1250° F. for the low air ratio to 1600° F. for the high air ratio with a B.t.u. content from 550 to 1100, the use of air being to provide partial combustion of the liquid petroleum gas which supports the heat of reaction as well as furnishing oxygen which is a good catalyst for cracking hydrocarbons. However, there are from 10 to 20% olefins made in this reaction and this concentration of olefins is in the presence of heat and oxygen, which is also a polymerization catalyst, making conditions ideal for polymerization of some of these olefins before the gas stream can be cooled sufficiently to stop the reaction. There is also a small amount of aliphatic aldehydes formed from the oxidation of the liquid petroleum gas and, since olefins and aldehydes are both very reactive chemicals, it is possible for the olefins and aldehydes to react not only with themselves, but also with each other, thereby forming a mixture of polymeric materials ranging from light oil to very dense, dry polymers. It has been noted that the gaseous polymer formations occur in appreciable amounts at temperatures as low as 350 to 400° F. but below 300° F. the reaction rate decreases until it is relatively unimportant. At temperatures below 120° F., the polymeric material is sticky and gummy and, unless removed, adheres to the walls of distribution pipes, storage vessels and equipment giving rise to the problem known in the field as equipment fouling and, ultimately, to distribution system failure as the pipes close.

Another problem with the by-products of liquid petroleum gas formation is that corrosive aldehydes and acids are formed which have deleterious effects on the system. For instance, upon producing 700 B.t.u. gas from butane approximately .5 gram per cubic foot total acids and aldehydes are made. About 30% of this is acids, mainly formic acid, and the other 70% is mainly formaldehyde with a small quantity of other aldehydes and alcohol. These very corrosive products compound the aforesaid problem of the polymeric material.

In the past, in an effort to remove the gums and because it is known that fine particles of polymer have a very high surface tension in contact with water and are very insoluble in water, efforts have been made, (a) to stop the aforesaid polymerization reaction of the materials, and (b) to remove the polymers, by rapidly cooling the gases in a water bath which quickly reduces the temperature of the reformed gas (a) to stop the reaction and (b) to convert the polymeric material that has formed into a solid or semi-solid state for removal. The gases leaving the reformers have, in the past, been passed from bottom to top through a cooling tower of water sprays, often called a scrubber, which is disposed closely adjacent the reformer whereby the hot gases are quickly cooled so that much of the polymeric material is at least partly solidified in the tower and washed away. However, some dry polymers and some of the soft gums pass through the scrubber and must be removed before the gases are fed into the compressor in order to get clean gas into the distribution system. To partially remove the dry polymers and some of the soft gums passed through the scrubber, some of the existing operations pass the cooled gas through filter boxes or columns which are filled with wooden chips in order to remove particles. As an alternative method of removing the polymers and soft gums which pass through the water tower, filter housings are sometimes used including a cartridge arrangement similar to that used in air conditioning systems so that an operator can change filter pads by removing the used one and replacing it with a new one. It has been found, however, that such filtering of the gases is expensive and still permits an objectionable amount of the gums to accumulate in the system pipe-lines which build up and require periodical cleaning of the system and oftentimes system failure. Additionally, the filtering material must be continually changed or otherwise cleaned to remove gum accumulations.

In the instant invention, objectionable amounts of the polymeric materials are removed from the gases while still in a vapor or gaseous state of reduced temperature relative to the exit temperature from the reformer by passing the gases through a moist bed of activated carbon disposed intermediate the cooling tower and the reformer machine. The temperature of the gases between the exit of the reformer and the first surface of the carbon bed to be encountered by the moving gases is reduced because activated carbon does not adsorb the objectionable vapor effectively above 300° F. The temperature reduction may be accomplished (a) by expanding the reformed gases into a chamber before passage to the carbon bed during which expansion there is a temperature drop, (b) by providing a controlled moisture content in the gas from the reformer, which content, as will be explained hereinafter, is controlled so that a condensate forms on the lower face of the activated carbon bed which acts to cool the gas and form a cooling environment for the gas or (c) by a combination of expansion and moisture control. After passing through the container for the activated carbon, the gases are conducted to the conventional scrubber and cooled to remove remaining objectionable materials following which the gases are stored in storage tanks or distributed.

Accordingly, it is an object of this invention to provide a simple, practical and economical process for extracting acids and gums from gases formed in a gas reformer.

In accordance with these and other objects which will become apparent hereinafter, the instant invention will now be described with reference to the accompanying drawings illustrating a preferred embodiment thereof.

Figure 2:
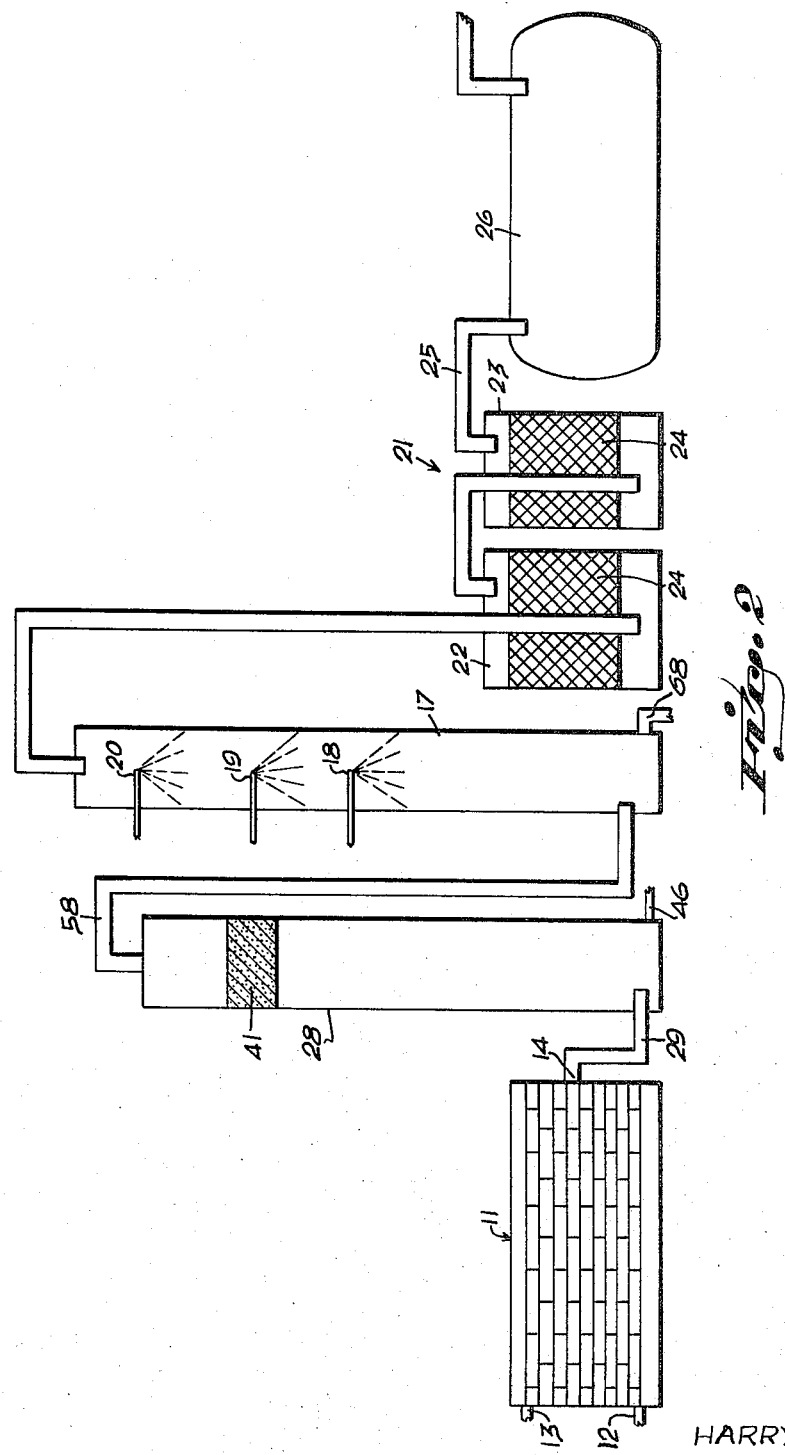

In the drawings:

FIG. 1 is a flow chart schematically illustrating the prior art operation for removing some of the gums and acids which are produced in the reformers of liquid petroleum gases to be stored or distributed in transmission lines to domestic operations;

FIG. 2 schematically illustrates the instant invention for removing the gums and acids which are produced in the reformers of liquid petroleum gases to be stored or distributed in transmission lines to domestic operations; and FIG. 3 illustrates the activated carbon tower of the instant invention.

Referring to the drawings, wherein like reference characters designate like or corresponding parts throughout the different views, and referring particularly to FIG. 1, which illustrates the prior art, the numeral 11' represents a reformer into which liquid petroleum is supplied at a controlled rate, through a port such as at 12', together with air through a port such as at 13'; the liquid fuel is cracked in the reformer, cooled by suitable means to an exhaust temperature in the range of 500° F. to 700° F. and exhausted through a port 14' for passage through a pipe 16' to a cooling tower or scrubber 17' where it is cooled, such as by a plurality of cool water sprays 18', 19' and 20'. From the water tower, the cooled gas is conducted through a filtering means 21', such as the interconnected filter boxes 22' and 23', which are filled with wood shavings 24' and, then, through pipes 25' for storage in a tank 26' and ultimate distribution through transmission lines, such as 27', for use in domestic operations.

Referring to FIG. 2, in which the instant invention is shown schematically, an activated carbon tower 28, to be described more fully in the next paragraph, is connected intermediate (a) a conventional reformer 11 having conventional fuel and air intake ports 12 and 13 respectively and an exit port 14, and (b) a cooler tower or scrubber 17 having cooling means, such as water sprays 18, 19 and 20. A pipe 29 provides a sealed path for transmission of the gases of the reformer to the carbon tower 28.

With reference to the carbon tower of FIG. 3, the gases are traveled through the sealed gas conductor path 29 and introduced into the housing 31 at the lower end 32 for entrance through a baffle plate 33 supported on the bottom 34. The housing 31 provides a lower gas expansion chamber 36 and an upper chamber 37. A stainless steel screen floor 38 separates the upper and lower chambers, 36 and 37 respectively, the said floor being supported on a tray holder or angle member 39 suitably fastened to the sides 40 of the housing. A charcoal bed 41 is supported on the floor and is capped with a stainless steel screen cap 42 which is also supported on the walls 40 by a suitable tray holding member such as the angle member 43. Intermediate the bed 41, between the screen floor 38 and the cap 42, guide means, such as an inwardly projecting annular angle member 44, are provided to constrain the gas stream to travel through the bed and to prevent travel along the walls 40 of the housing. The bottom 34 of the housing 31 is sloped to permit condensate, the formation of which will be described hereinafter, to pass through a drain 46 which can be controlled by means of a valve 47. In the upper chamber, above the bed 41, a steam ring 51 having a plurality of radial openings 52 is provided for introducing uniformly distributed low-pressure wet steam of approximately 4 or 5 pounds per square inch pressure into the housing from a source not shown through the pipe 53 for periodically reactivating the charcoal bed in a manner to be described. The upper end of the housing 56 is provided with an opening 57 for attachment of the pipe 58 through which the gases are traveled to the conventional scrubber 17.

Referring to the gas conductor path 29 communicating between the reformer 11 and the carbon tower 28, means 61 are provided for introducing moisture, in the form of a water spray or steam, in a volume which is adapted to be controlled by a needle valve 62 or a similar device. A pressure gauge 63 and a thermometer 64 are operatively connected to measure the pressure and temperature of the gases after exit from the reformer.

Referring to the pipe 58 connecting the carbon tower 28 and the scrubber 17, a second thermometer and pressure gauge, 66 and 67 respectively, are provided adjacent the opening 57 to measure the temperature and pressure of the gases from the carbon tower.

The operation will best be understood by first considering the prior art operation of FIG. 1 in relation to the instant invention, shown in FIG. 2. Referring to FIG. 1, as the gas leaves the reformer through the pipe 16, it is cooled as rapidly as practical (a) to solidify or partly solidify the gums, (b) to stop the polymerization of the olefins, and (c) to cause the acids to condense and be drained away through the drain as at 68. This is often referred to as the quick quench operation. In the instant invention shown in FIG. 2, before the gases are passed through the scrubber 17, the gases are cooled, such as by expanding them or otherwise cooling them with $H_2O$ or a combination of expansion and cooling and then passing them through a moist bed of activated carbon at a temperature on impact below 350° F., preferably about 225° F., and to adsorb quantities of the objectionable polymeric material while it is in a gaseous state and to emerge from the bed at a temperature of about 120° F.

The preferred operation of the instant invention is understood in more detail upon reference to FIGS. 2 and 3. The stream of gas from the reformer 11 is conducted through the pipe 29 to the carbon tower 28. Prior to the entry of the gases into the carbon tower, a metered amount of moisture is introduced into the gases by suitable means, such as a needle valve 62 connected to a source of $H_2O$. As the gas enters the lower chamber 36 of the carbon tower, which is relatively large in cross-sectional area in relation to that of the pipe 29, it is expanded and is directed, by means of the baffle plate 33, to travel through the lower chamber substantially uniformly over the cross-sectional area thereof. The gas stream impinges upon and passes through the screen floor 38, the activated carbon bed and the cap 42, and on through the exit port and into the pipe 58. From the opening 57 of the top 56 of the carbon tower the gas stream continues to the water tower where it is cooled by the water sprays to condense remaining corrosive vapors having boiling points below the exit temperature of the gas stream from the carbon bed, which condensate is drained away with the wash water from the bottom of the water tower and discharged in a well or the like. Preferably, the gases are then passed through filtering means 21 for travel to a suitable storage tank 26 or into the distribution system.

As previously noted hereinbefore, in order for the objectionable polymeric material to be adsorbed effectively by the activated carbon bed, there must be a drop in temperature of the gas after it leaves the reformer and before it reaches the bed. With further reference to that portion of FIG. 2 between the reformer 11 and the carbon bed 41 of the carbon tower 28, after the gas is passed from the severe temperature conditions of the reformer during cracking of 1250° F. to 1600° F. and before they reach the activated carbon bed, the temperature drop should be such that the temperature of the gas is reduced to less than 350° F., and preferably to a temperature of approximately 225° F., because for temperatures below 350° F. the polymers are not formed in any appreciable amount as vapors and above 350° F. the activated carbon is not effective to adsorb the polymerized material. The adsorption is found to be most effective by a moist carbon bed having a temperature such that the condensate dripping from the carbon tower has a temperature of between 220° F. and 230° F. and the exit temperature of the gas from the tower is about 120° F. to 130° F. If the gases are cooled below 120° F. the activated carbon bed becomes gummed as the particles solidify or tend to solidify and are trapped in the bed.

In a system of fixed geometrical physical characteristics, including the reformer 11 and a carbon tower 28 of relatively large cross-sectional area which are interconnected by a sealed gas conductive path 29 of relatively small cross-sectional area, the amount of temperature drop because of the expansion of the gas before it reaches the activated charcoal bed of the carbon tower may be supplemented, if required, depending upon the moisture of the air which is taken into the reformer with the fuel, by controlling the moisture content of the gases between the reformer and the carbon bed by manipulation of the valve 62 to introduce $H_2O$ into the gas stream such that the thermometer 66 reads approximately 120° F. Thus, in a system having fixed physical characteristics a measure of control of the temperature of the gas upon entry into the carbon bed may be achieved by introducing $H_2O$ into the gas stream between the reformer and the carbon bed in an amount such that the temperature reading of a strategically located thermometer may be utilized to maintain the best operating range. While the exact physical or chemical reaction resulting from the introduction of water into the gas stream is not known, it appears that the water not only cools the gas, but on expansion and contact with the activated carbon forms a condensate which has a cooling effect. The condensate drips from the under-surface of the carbon bed in the form of a drizzle which is quite acidic having a pH in the range of 3 to 4. It would appear that heat is taken away in this manner so that there is a temperature drop in the gases such that the activated carbon tower effectively adsorbs the objectionable polymeric material while in the vapor state. It has been found that atmospheric conditions affect the amount of $H_2O$ which is required to be introduced in order to maintain the proper temperature for the carbon bed.

Specifically, satisfactory results have been obtained in accordance with the following. A cylindrical carbon tower of 48 inch diameter which is 6 feet in height is disposed adjacent the reformer and a moist carbon bed of 6/8 mesh 12 to 18 inches in depth is supported approximately 4 feet above the tower floor, the said carbon tower being connected to the reformer by means of a sealed conductive path which is 8 inches in diameter. Under these conditions, gases leaving conventional reformers at a temperature of 500° F. to 600° F. include some moisture as a result of the air drawn into the reformer simultaneously with the fuel and, as required, this may be supplemened by manipulating the needle valve in the path 29 so that the exit temperature of the gas stream from the tower is 120° F. to 124° F. and the temperature of the condensate drained from the tower is approximately 220° F. to 230° F. After passage of the gas through the carbon tower it is directed through the scrubber to remove acids and impurities having a boiling point less than the exit temperature from the charcoal bed. These impurities are drained away and the gas may be passed through filtering material and then passed to storage.

When saturated, the activated charcoal bed may be reactivated by passing steam under about 3 to 4 pounds per square inch pressure at a temperature of about 300° F. through the carbon tower after the exit port has been closed by valve 71 and the inlet port has been closed by a valve 72 so that the material removed from the bed may be drained at the valve 47 through the drain 46.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A process for purifying petroleum gases for preventing the accumulation of a substantial portion of residual gums and tars in distribution lines of a distribution system comprising:

cracking liquid hydrocarbons at a temperature range from about 1250° F. to 1600° F.;

directing the reaction gases to the lower end of a substantially vertically disposed tower and cooling the gases thereat to a temperature from about 225° F. to 350° F.;

passing the gases through a moist, activated-charcoal filter in said tower and maintaining humidity conditions thereat so as to cause a condensate to form on the undersurface of said filter and so as to maintain the temperature of gases above said filter at a temperature above about 120° F., whereby objectionable polymeric materials are adsorbed by said filter while in a vapor state; and directing the gases from above said filter to a distributing system; whereby residual gums and tars are at a minimum when distributed.

2. The process as claimed in claim 1 including the step of periodically flushing the filter to reactivate the filter and collecting the condensate in the bottom of the tower to salvage the same.

3. The process as claimed in claim 1 in which said reaction gases are cooled by supplemental moisture and expansion before contacting said filter.

References Cited by the Examiner
UNITED STATES PATENTS

| | | | |
|---|---|---|---|
| 1,547,924 | 7/1925 | Kerschbaum | 55—74 |
| 1,902,004 | 3/1933 | Whitlock | 48—214 |
| 2,465,235 | 3/1949 | Kubicek. | |
| 3,044,179 | 7/1962 | Chapman et al. | 48—215 X |

MORRIS O. WOLK, *Primary Examiner.*

JOSEPH SCOVRONEK, *Examiner.*